(12) United States Patent
Turski

(10) Patent No.: US 8,806,515 B2
(45) Date of Patent: Aug. 12, 2014

(54) EXPOSURE OF REMOTELY INVOKABLE METHOD THROUGH A WEBPAGE TO AN APPLICATION OUTSIDE WEB BROWSER

(71) Applicant: Microsoft Corporation, Redmond, WA (US)

(72) Inventor: Andrzej Turski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/669,141

(22) Filed: Nov. 5, 2012

(65) Prior Publication Data

US 2013/0067503 A1 Mar. 14, 2013

Related U.S. Application Data

(62) Division of application No. 12/199,814, filed on Aug. 28, 2008, now Pat. No. 8,316,387.

(51) Int. Cl.
*G06F 9/46* (2006.01)
*G06F 9/54* (2006.01)

(52) U.S. Cl.
CPC ............... *G06F 9/548* (2013.01); *G06F 9/547* (2013.01)
USPC ........................................................ 719/330

(58) Field of Classification Search
None
See application file for complete search history.

(56) References Cited

U.S. PATENT DOCUMENTS

| 5,928,330 A | 7/1999 | Goetz et al. |
|---|---|---|
| 6,546,554 B1 | 4/2003 | Schmidt et al. |
| 6,725,237 B2 | 4/2004 | Clairmont et al. |
| 6,873,984 B1 | 3/2005 | Campos et al. |
| 6,988,249 B1 | 1/2006 | Arvanitis et al. |
| 7,069,310 B1 * | 6/2006 | Bartholomew ............... 709/219 |
| 2002/0194272 A1 | 12/2002 | Zhu et al. |
| 2004/0010574 A1 | 1/2004 | Cammick et al. |
| 2006/0167983 A1 | 7/2006 | Webb et al. |
| 2007/0288644 A1 | 12/2007 | Rojas et al. |
| 2008/0126476 A1 | 5/2008 | Nicholas et al. |

OTHER PUBLICATIONS

"A Guide to Firefox Extensions"; retrieved from the internet at: http://www.pcc-services.com/articles/firefixextensions.html. Dated: Jun. 25, 2008 pp. 1-5.
"Java Webstart Overview"; Sun Micro Systems, Inc. Dated: May 2005 pp. 1-13.
"Microsoft Computer Dictionary"; 2008 Microsoft Press, Fifth Edition. p. 499.

(Continued)

*Primary Examiner* — Qing Wu
(74) *Attorney, Agent, or Firm* — Dan Choi; Carole Boelitz; Micky Minhas

(57) ABSTRACT

Web browsing environments are commonly used to facilitate user interaction with data over the Internet. A web browser is a tool used to view and interact with a webpage. A webpage may interface with a web service to provide remote functionality that the webpage does not locally provide. An effective method for specifying and consuming remote functionality that an application invokes outside of the web browser is disclosed herein. A webpage exposes remote functionality (e.g., web service) that a web browser and/or browser extensions may discover through browsing the webpage. A browser extension associated with an application determines whether the application is compatible with the remote functionality. Once a compatible application is determined, it may be executed so as to connect to and invoke the remote functionality outside of the web browser. The application may provide a more robust experience with the remote functionality compared to the web browsing environment.

20 Claims, 8 Drawing Sheets

(56) References Cited

OTHER PUBLICATIONS

"The End of Desktop vs. Web Apps"; Retrieved at: http://inessential.com/?comments=1&postid=3406 Dated: Jun. 25, 2008 pp. 1-5.
Ezzy, et al.; "Webified Desktop Apps vs. Broweser-based Apps"; Retrieved at: http://www.readwriteweb.com/archives/webified_desktop_apps_vs_browser_apps.php Dated: Jun. 25, 2008 pp. 1-5.
"Why Google Succeeds: Part 1"; Retrieved at: http://www.microsoft-watch.com/content/web_services_browser/why_google_succeeds_part_1.html Dated: Jun. 25, 2008 pp. 1-4.
Office Action cited in related U.S. Appl. No. 12/199,814 Dated: Dec. 8, 2011 pp. 1-10.
Response to Office Action cited in related U.S. Appl. No. 12/199,814 Dated: Jan. 9, 2012 pp. 1-12.
Non Final Office Action cited in related U.S. Appl. No. 12/199,814 Dated: Feb. 14, 2012 pp. 1-33.
Amendment cited in related U.S. Appl. No. 12/199,814 Dated: Jun. 14, 2012 pp. 1-14.
Notice of Allowance cited in related U.S. Appl. No. 12/199,814 Dated: Jul. 17, 2012 pp. 1-18.

\* cited by examiner

EXPOSURE OF REMOTELY INVOKABLE METHOD THROUGH A WEBPAGE TO AN APPLICATION OUTSIDE WEB BROWSER

RELATED APPLICATION

This application is a divisional of U.S. patent application Ser. No. 12/199,814, filed on Aug. 28, 2008, entitled "EXPOSURE OF REMOTELY INVOKABLE METHOD THROUGH A WEBPAGE TO AN APPLICATION OUTSIDE WEB BROWSER," at least some of which may be incorporated herein.

BACKGROUND

A web browsing environment enables users to share and view information over the Internet. A web browser is a tool that provides a user interface and functionality (e.g., searching, displaying, etc.) for interacting with information over the Internet (e.g., webpage). Much advancement, such as web services and browser extensions, has been made to provide a more immersive user experience when interacting with information within a web browsing environment. A drawback to interacting with information within a web browsing environment often comprises limitations to privacy, configurability, and overall user functionality. In contrast, a desktop environment facilitates applications that may have a more enhanced user interface, configurability, user functionality, and/or security than a web browsing environment.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, a remote functionality is exposed through a webpage, but can be invoked by an application outside of the webpage. This allows additional features (e.g., improved security, performance, customization, etc.) that may provide an enriched user experience to be made selectively available to a user (where such features may not be available through a web browsing environment alone). An application may invoke the remote functionality within a desktop environment, for example.

A webpage may expose remote functionality by specifying a web service, a remotely invokable function, a remote file, etc. The webpage may specify the remote functionality within an HTML file (e.g., HTML header tag, HTML body tag, etc.) associated with the webpage. For example, the webpage may specify information comprising: a web service; requirements for invoking the web service; compatible applications capable of invoking the web service; the location of the web service; and/or additional security or configuration parameters needed for the interaction with the web service. This allows a webpage to expose data and/or functionality that are located remotely from the webpage.

A web browser is merely one tool that may be used to discover exposed remote functionality. Browser extensions are another tool that may be used to discover remote functionality, determine a compatible application, and/or execute the compatible application to invoke the remote functionality. When a user browses a webpage with a web browser, the web browser and/or browser extensions may indentify the exposed remote functionality within the webpage. When one or more remote functionalities are indentified, a browser extension may determine whether an application associated with the browser extension is compatible with the remote functionality (e.g., the application is able to invoke the remote functionality outside of the web browser). A notification comprising the remote functionality and/or compatible applications may then be presented to a user.

The application (e.g., a browser extension, desktop application executing outside of the web browser, a locally installed proxy to another web service, etc.) is invoked based upon a user confirmation that the application is to be invoked. The application is invoked to connect to the remote functionality and consume the data provided by the remote functionality. This allows the user the ability to interact with the data from the remote functionality through the application, where the application may provide a richer user experience and more control than interacting with the remote functionality through the webpage.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
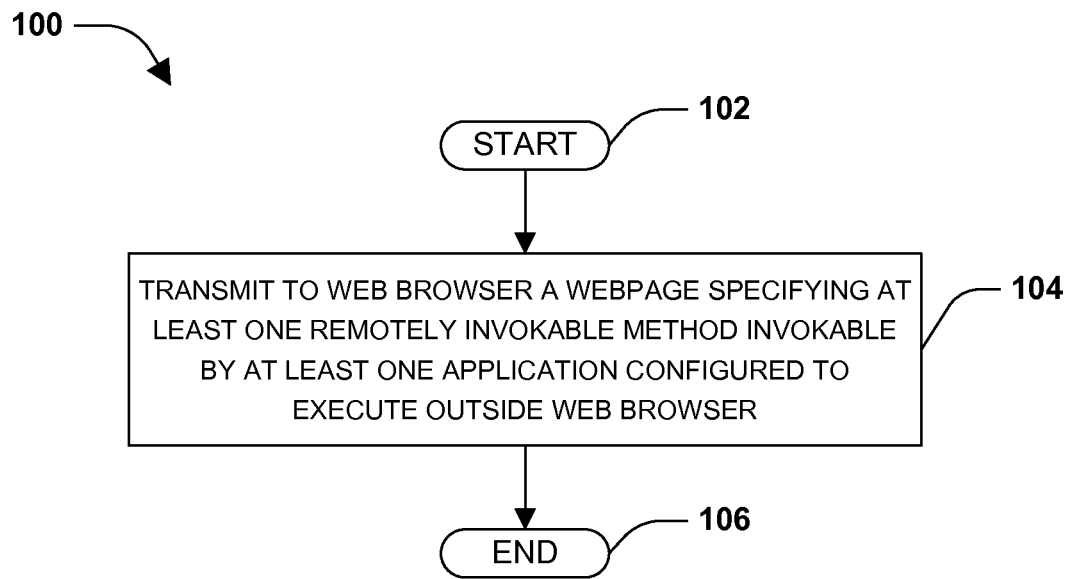
FIG. 1 is a flow chart illustrating an exemplary method of exposing a remotely invokable method, through a webpage, to an application outside a web browser.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Web browsers are commonly used to search, view, and interact with information available over the Internet. A web browser may receive and display information comprised within a webpage. The webpage may implement web services to provide additional functionality that is located remotely to the webpage. For example, a news webpage may provide data and/or functionality that are local to the news webpage (e.g., current news, previous articles, sports scores, etc.). The news webpage may also provide data and/or functionality that are not local to the news webpage, such as, a remote weather search functionality. When a user inputs a zip code into the news webpage, the zip code and/or a weather search request may be sent to a weather web service located remotely to the news webpage. The weather web service executes the weather search request and sends a result (e.g., the current weather corresponding to the zip code) to the news webpage to display for the user. Techniques for including data from other services in a webpage are often referred to as "mash-ups".

Much advancement has been made to facilitate and enrich user interaction within a web environment. Web browsers may display up to date information that get updated in real time. Users may upload information and data files to share with other users. The web browser may allow a user to interact with the information comprised within the webpage (e.g., execute a web application). Many web browsers host browser extensions that provide additional functionality that the web browser may not provide (e.g., a music player, file viewer, video player, etc.). However, only functionality explicitly programmed into web pages is available to end users. There is no discovery mechanism for the remote functionality (e.g., a web service) exposed through the webpage that would allow browser extensions or outside applications to interact independently with the data in a way not provided by the webpage creator.

A drawback to using a web environment for facilitating user interaction with information over the Internet is the limited ability to provide a rich user experience within the web browser. Web browsers may comprise various design, technical, and/or security restraints. For example, as security features are enabled within a web browser, functionality may be disabled to accommodate the security features. The disabled functionality may have provided a more interactive, rich and immersive user experience of the data and/or functionality.

As an alternative to a web browsing environment, a desktop environment (e.g., operating system environment) may provide a more robust user experience than a web browsing environment. Desktop applications may provide a rich user interface that is easily customizable. Desktop applications may provide a high level of security without restraining functionality provided to a user. Many desktop applications integrate with a remote data provider (e.g., e-mail server, online help, etc.), but may be limited to a specific configuration for connecting to the remote data provider.

The term "application configured to execute outside a web browser" as used herein is intended to encompass applications that execute application functionality that is not explicitly programmed into a webpage and/or web browser (e.g., remote functionality from a web service that is invoked outside of a web browser). The application may execute inside and/or outside the web browser process. Examples of web browser functionality are interpreting HTML, executing embedded scripts, invoking controls, etc. An example of application functionality not programmed into a webpage and/or web browser is a browser extension or standalone application exposing its own user interface and communicating directly with a web service that provides remote functionality.

As provided herein, data resident behind a webpage can be connected to an application outside of the web browser. The data behind a webpage may be a data file (e.g., an XML configuration file) and/or a remotely invokable method (e.g., functionality that may be invoked through a web service, functionality that is not programmed into the webpage, etc.).

A web browser may be used to facilitate the discovery of a remotely invokable method that a webpage exposes. The web browser may comprise one or more browser extensions that are associated with an application. When a user browses a webpage with the web browser, the web browser may request the webpage from a web server. The web server may respond by transmitting an HTML file, representing the webpage, to the web browser. The transmitted HTML file may specify a remotely invokable method that an application (e.g., browser extension or desktop application) may execute outside of the web browser. The webpage may expose additional information, such as, for example, the location of the remotely invokable method, compatible applications, input requirements for invoking the remotely invokable method, etc.

The specification of the remotely invokable method may be within an HTML header tag, an HTML body tag, and/or any other appropriate location within the HTML file. It may be appreciated that the specification is not limited to a location within an HTML file, but may be located within a programming language file, an XML file, or any other location. A single webpage may specify multiple remotely invokable methods representing different ways of accessing the data, as appropriate. RSS services are one example of a service embedded into the HTML of a webpage. Upon browsing to a webpage with embedded RSS services data, for example, the RSS services data can connect to a browser feed functionality that can pass the data to a desktop service outside of the browser.

Once the HTML file is received, the web browser and/or a browser extension identify the remotely invokable method. The browser extensions make a determination as to whether the associated application is compatible with the remotely invokable method. An application may be compatible if the application is able to invoke (e.g., execute) and consume the result of the remotely invokable method. To accurately determine compatibility, the webpage may specify additional information regarding the remotely invokable method. The webpage may specify a compatible application list, a description of functionality the remotely invokable method provides, and/or any other information that may be used in determining application compatibility.

Once an application compatibility is determined (e.g., a list of compatible applications is complied), a notification may be presented to a user. The notification may comprise the identified remotely invokable method, and/or at least one compatible application. If the user confirms an application is to be invoked, then the application is executed (e.g., invoked) to invoke the remotely invokable method and provide a result of the invocation of the remotely invokable method. The application may invoke the remotely invokable method by sending a request with input data to the remotely invokable method for execution. If the remotely invokable method is comprised within a web service, then the application may send a request for the web service to execute the remotely invokable method and return the result of the execution. The remotely invokable method may be invoked one or more times, depending on the application functionality. The remotely invokable method reference may be stored for later use. The method may be invoked periodically. If the webpage exposes multiple remotely invokable methods, the application may invoke one or more remotely invokable methods in any order. The result of the invocation(s) may comprise a control, image, text file, data stream, set of executable instructions, user interface, etc.

Connecting data behind a webpage to an application allows the remote functionality to reside behind the web page (e.g., independent of the webpage and/or web browsing environment) without being explicitly programmed into the webpage. The application may execute outside the browser (e.g., inside or outside the web browser process), wherein the application provides the remote functionality that is not explicitly programmed into the webpage.

The ability to expose remote functionality residing behind the webpage relieves a webpage creator from providing all possible functionality directly on the webpage. Users that are interested in a special functionality (e.g., complex search queries) may invoke the special functionality through applications installed on the user's machine. The ability to interact with the remote data through a chosen application gives more power to an end user. End users have the choice to use applications that are best suited for the user's operating environment, performance level, and/or user interface design. Because the application can connect automatically to the remote functionality residing behind the webpage, users may use familiar web searching/browsing metaphors to find the data, then seamlessly/effortlessly switch to an application of the user's choice for a richer data interaction.

An application that executes within a desktop environment may provide a more secure environment for interacting with the result from the invocation of a remotely invokable method because the received data may not comprise executable code. The application code, which is assumed to be secure, is executed on the client machine, but the remote functionality is executed at a remote source (e.g., web service host server). This mitigates security issues arising from executing code from an untrusted webpage through a web browser and/or web application.

Executing remote functionality through an application configured to execute within a desktop environment may provide a rich user interface, high performance, easy customization, and/or high level of security. The application may provide more control over how the user interacts with the remote functionality in comparison to a web browsing environment. The user may use the application as a comprehensive tool to interact and invoke multiple remotely invokable methods from one or more web services.

One embodiment of exposing a remotely invokable method, through a webpage, to an application outside a web browser is illustrated by an exemplary method 100 in FIG. 1. The method 100 may be performed on a server machine (e.g., web server) by transmitting HTML to a client machine (e.g., web browser). At 102, the method begins. At 104, a webpage specifying at least one remotely invokable method invokable by at least one application configured to execute outside a web browser is transmitted to the web browser. The webpage may specify the remotely invokable method by specifying a web service, a webpage address, a server that comprises the remotely invokable method, and/or any other identification of a remotely invokable method. A webpage may specify multiple remotely invokable methods. For example, a photo album webpage may specify a photo album web service that comprises an add photo, remove photo, search photos, and share photos methods.

A webpage may specify the remotely invokable method within an HTML file, an HTML header tag, an HTML body tag, a programming language file (e.g., code behind a control event), and/or a XML file. The webpage may specify additional information regarding the remotely invokable method that may provide information used in determining if an application is compatible with the remotely invokable method. For example, the webpage may specify a compatible application list, a communication protocol and/or an interface exposed by the remotely invokable method; the actual type of data provided by the remotely invokable method; and/or any other information that may be used in determining whether an application compatibility. The specified remotely invokable method and/or additional information may be consumed (e.g., indentified, interpreted, etc.) by a web browser and/or browser extensions. The specified remotely invokable method may also be invoked (e.g., executed) by an application.

An example of the method 100 is where a photo viewing application is installed by a user onto a user machine (e.g., client machine). During installation, a photo viewing browser extension is incorporated into a web browser on the user machine. When the user browses, with the web browser, to a photo album webpage, a request is sent by the web browser to a server hosting the photo album webpage. The server responds with an HTML file corresponding to the photo album webpage. The HTML file comprises an HTML header tag that specifies a photo album web service and a compatible application list. When the web browser receives the HTML file, the specified photo album web service is identified and the photo viewing browser extension makes a determination whether the photo viewing application is compatible with the specified photo album web service (e.g., the photo viewing application is specified within the compatible application list). If the photo album application is compatible, then the photo album application is invoked. The user is able to invoke, through the photo album application, the remote functionality of the specified album web service.

In an alternative example, the webpage may specify the photo album web service and functionality that the photo album web service provides (e.g., photo management functionality, add photo method, remove photo method, etc.). The photo viewing browser extension makes a determination whether the photo viewing application is compatible with the specified photo album web service based upon the ability of the photo viewing application to invoke the specified functionality and consume the result of the invocation.

Figure 2:
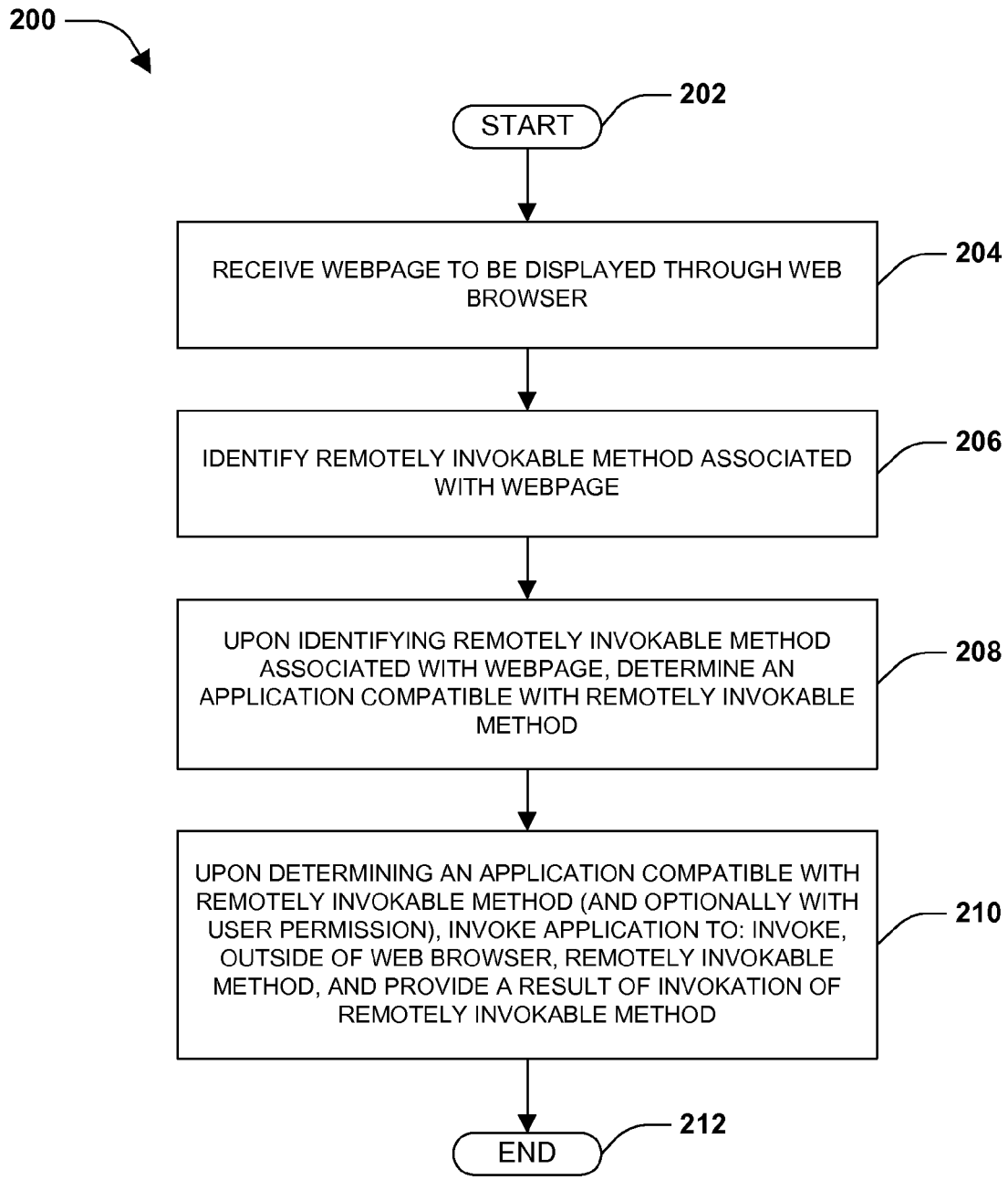
FIG. 2 is a flow chart illustrating an exemplary method of invoking, outside a web browser, a remotely invokable method through an application.

One embodiment of invoking, outside a web browser, a remotely invokable method through an application is illustrated by an exemplary method 200 in FIG. 2. At 202, the method begins. At 204, a webpage to be displayed through a web browser is received. A web browser may receive the webpage (e.g., an HTML file representing the webpage) in response to an HTTP request to a web server for the webpage. The web server may respond by sending an HTML file, representing the webpage, to the web browser.

At 206, a remotely invokable method associated with the webpage is identified. The web browser, a browser extension, and/or any other web environment component may perform the identification. For example, when an HTML file is received, the web browser may search within the HTML file to identify a specified (e.g., exposed) remotely invokable method. The web browser may search with the HTML file for a web service, webpage address, server address, and/or any other specification of a remotely invokable method.

At 208, upon identifying one or more remotely invokable methods associated with the webpage, a determination is made as to whether an application is compatible with the remotely invokable method. The web browser, browser extensions, and/or any other web environment components may perform the determination. An example of determining compatibility is where the web page requests browser extensions to determine if the application associated with the browser extension is compatible with the remotely invokable method based upon information (e.g., compatible application list, functionality of the remotely invokable method, etc.) specified by the webpage. Another example of determining compatibility is where one or more browser extensions identify the remotely invokable method. The browser extensions, without a request form the webpage, make a determination whether the application associated with a browser extension is compatible based upon the information specified by the webpage.

At 210, upon determining an application is compatible with the remotely invokable method, the application is invoked (e.g., the application may execute inside or outside of the web browser process, but provides functionality outside of the web browser functionality based upon the remotely invokable method). The web browser, browser extension, and/or any other component many invoke the application. Once the application is invoked, the application invokes, outside of the web browser, the remotely invokable method and provides a result of the invocation of the remotely invokable method.

The application that is to be invoked may be selected based upon user confirmation. A user may be presented with a notification comprising the remotely invokable method and/or at least one application compatible with the remotely invokable method. The notification may be presented as a menu within the web browser, as a control rendered within the webpage, as a user interface outside of the web browser, and/or as any other manifestation of a notification. The user may confirm an application that is to be invoked through to notification.

Once the application is invoked, the application may send a function invocation request (e.g., a command requesting the execution of the remotely invokable method and a result of the execution) and/or input data (e.g., input information consumed by the remotely invokable method during execution). In one example, an application may open a communication channel (e.g., bi-directional data channel) with a remotely invokable method. Upon receiving an invocation request, the remotely invokable function processes (e.g., executes functionality) the invocation request. The remotely invokable function sends a result (e.g., output of the executed functionality) to the application, wherein the result is provided outside of the web browser (e.g., the result is a product of some functionality provided outside of the functionality provided by a web browser).

The application may retain the communication channel and/or make further invocation requests to the remotely invokable function to provide the user with a seamless user experience with the data provided by the remotely invokable function. For example, a photo album desktop application, during execution, may make multiple calls, allowing a user to execute operations at different times to add photos, remove photos, and share photos.

Figure 3:
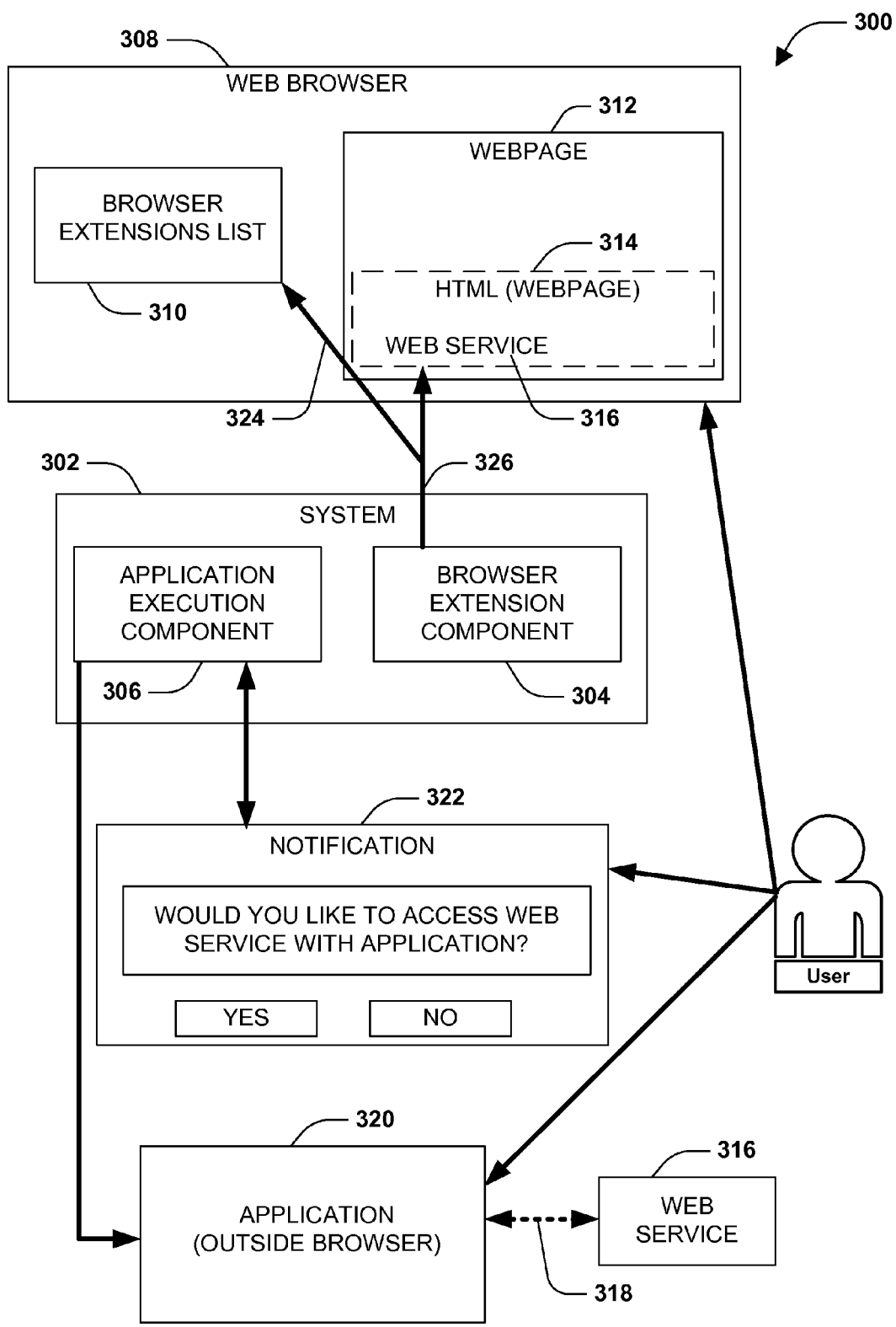
FIG. 3 is a component block diagram illustrating an exemplary system for connecting, outside a web browser, an application to a web service exposed through a webpage.

FIG. 3 illustrates an example 300 of a system 302 configured to connect (e.g., establish a communication channel 318), outside a web browser 308, an application 320 to a web service 316 exposed through a webpage 312. The web browser 308 comprises a browser extensions list 310. The browser extensions list 310 comprises browser extensions, which may be associated with applications (e.g., the application 320) configured to execute remote functionality outside of the web browser 308. The web browser 308 is configured to receive a webpage (e.g., HTML file) and present the webpage within the web browser 308. The web browser 308 receives an HTML file 314 that represents the webpage 312. The HTML file 314 specifies the web service 316.

The system 302 comprises a browser extension component 304 and an application execution component 306. The browser extension component 304 is configured to perform an identification 326 of one or more remotely invokable methods (e.g., the web service 316) exposed through a webpage (e.g., the webpage 312). The browser extension component 304 performs the identification 326 of the web service 316 by searching the HTML file 314 for a specification of a remotely invokable method (e.g., a web service, a data file, etc.).

The browser extension component 304 is further configured to perform a determination 324 of an application compatibility for the web service 316. Upon identifying the web service 316, the browser extension component 304 performs the determination 324 of the application compatibility. An example of determining the application compatibility is where the browser extension component 304 sends a request to the browser extensions within the browser extensions list 310. The request may comprise information regarding the web service 316 (e.g., compatible application list, functionality of the web service 316, etc.) and an instruction for the browser extensions to make a determination as to whether the application associated with the browser extension is able to invoke the web service 316 and provide a result from the web service 316.

Once the application compatibility is created (e.g., a list of applications compatible with the web service 316), then the application execution component 306 presents a notification 322 of the application compatibility. The application execution component 306 may be configured to present the notification outside of the web browser, within the web browser, and/or rendered within the webpage. A user, through the notification 322, may select an application to be invoked based. Upon receiving the application 320 that is selected to be executed, the application execution component 306 invokes (e.g., executes) the application 320. The application execution component 306 may send information regarding the web service 316 to the application 320. The application execution component 306 and/or the application 320 may create a communication channel 318, outside of the web browser 308, between the application 320 and a source of the web service 316.

The application 320 may invoke functionality (e.g., remotely invokable methods) of the web service 316. The application 320 may send requests and/or input data to the web service 316 and the web service 316 may send results to the application 320 through the communication channel 318. The functionality provided by the web service 316, through the application 320, may be interpreted as an application executing outside of a web browser. The application 320 may provide the user with a rich user interface, a secure environment, and a set of highly customizable features for interacting with the remote functionality (e.g., result) from the web service 316. In contrast the user may interact with the remote functionality through the webpage 312, which may provide a limited user experience.

Figure 4:
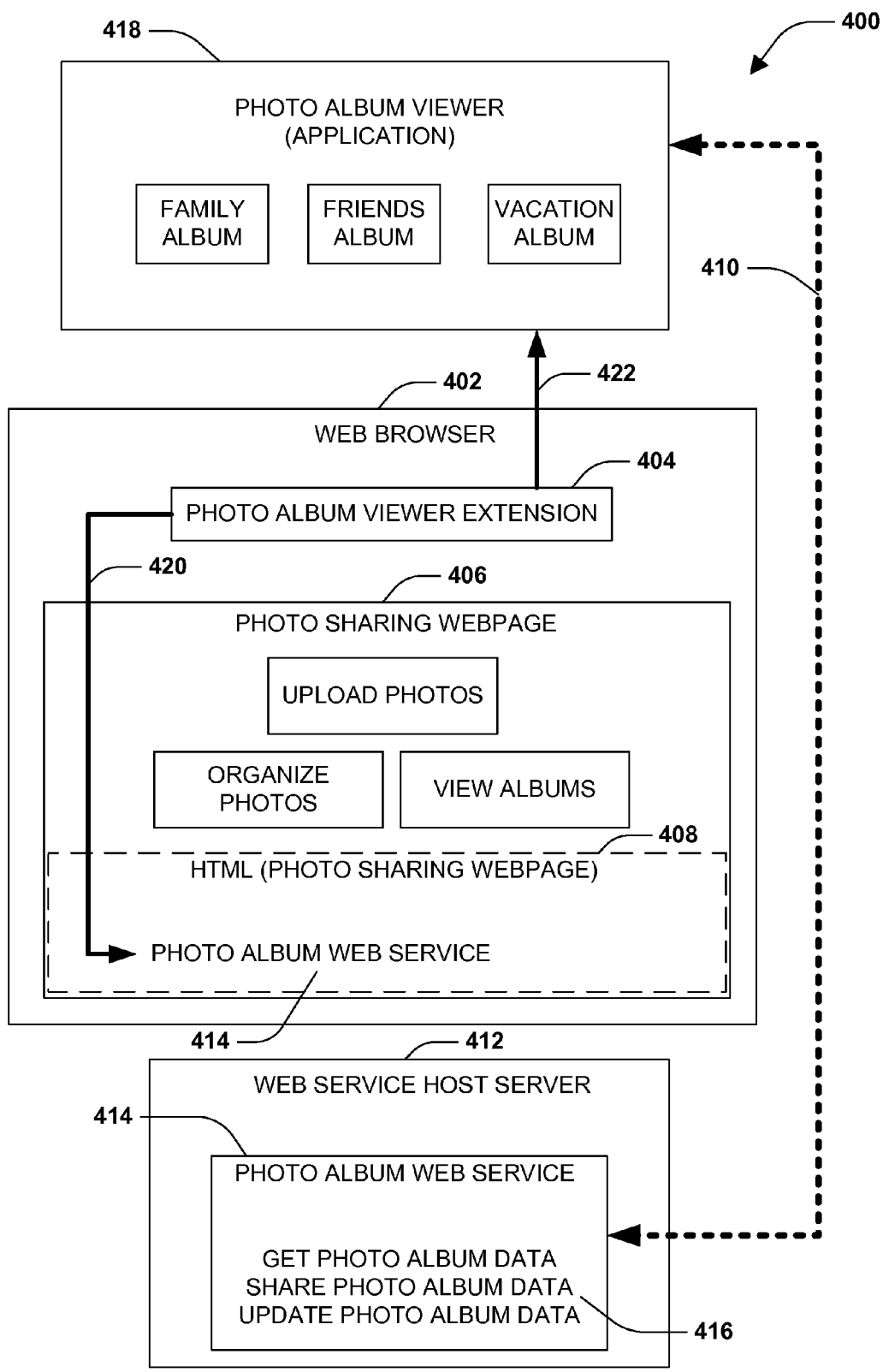
FIG. 4 is an illustration of an example of connecting, outside a web browser, an application to a web service exposed through a webpage.

FIG. 4 illustrates an example 400 of connecting (e.g., establish a communication channel 410), outside a web browser 402, an application (e.g., a photo album viewer 418) to a web service (e.g., a photo album web service 414) exposed through a webpage (e.g., a photo sharing webpage 406). The web browser 402 comprises a photo viewer extension 404 (e.g., a browser extension) associated with the photo album viewer 418. The photo album viewer extension 404, for example, may have been incorporated into the web browser 402 as part of an installation of the photo album viewer 418.

When the web browser 402 browses to the photo sharing webpage 406, a request may be sent by the web browser 402 to a server hosting the photo sharing webpage 406. The server may respond by sending an HTML file 408 that represents the webpage 406. The HTML file 408 specifies a photo album web service 414 that provides remote functionality (e.g., a set of remotely invokable methods 416). Upon receiving the HTML file 408, the web browser 402 identifies the photo album web service 414 specified within the HTML file 408. The web browser 402 requests the photo album viewer extension 404 to make a determination 420 whether the photo album viewer 418 is compatible with the photo album web service 414.

The photo album viewer extension 404 makes the determination 420 that the photo album viewer 418 is compatible with the photo album web service 414. The photo album viewer extension 404 may, for example, make the determination 420 by determining if the photo album viewer 418 is able to invoke and provide the result of the photo album web service 414. Another example of making the determination is where the photo album viewer extension 404 compares the photo album viewer 418 with a compatible application list. Yet another way of determining compatibility is by receiving information that a majority of files in a file collection are, in fact, photos.

Upon determining the photo album viewer is compatible with the photo album web service 414, the photo album viewer extension 404 performs an invocation 422 of the photo album viewer 418. The photo album viewer 418 invokes, outside of the web browser 402, the photo album web service 414. The photo album web service 414 may be invoked by the creation of the communication channel 410. It may be appreciated that a remotely invokable method (e.g., web service) may be invoked without the creation of a communication channel.

Invoking the photo album web service 414 outside of the web browser 402 provides the ability for a desktop application (e.g., photo album viewer 418) to provide functionality (e.g., full screen slide show) that the photo sharing webpage 406 and/or the web browser 402 do not natively provide (e.g., functionality not explicitly programmed into the webpage and/or web browser).

The invocation by the photo album viewer 418 may comprise a request to the photo album web service 414, located at a remote source (e.g., a web service host server 412), to execute one or more remotely invokable methods 416. The photo album web service 414 sends a result of the invocation (e.g., output of the executed remotely invokable methods) to the photo album viewer 418. A user, by interacting with the photo album viewer 418, is able to interact with the remote functionality of the photo album web service 414. For example, the user may use the photo album viewer 418 to get, share, and update photos by invoking the photo album web service 414.

Example 400 illustrates the discovery of remote functionality by browsing a webpage with a web browser. The webpage exposes the remote functionality that may be invoked, outside of the web browser, by an application. A notification may be presented, wherein the user has the ability to select a desired application to invoke the remote functionality. The desired application may provide a rich user interface to the remote functionality that the web browser may not provide.

Figure 5:
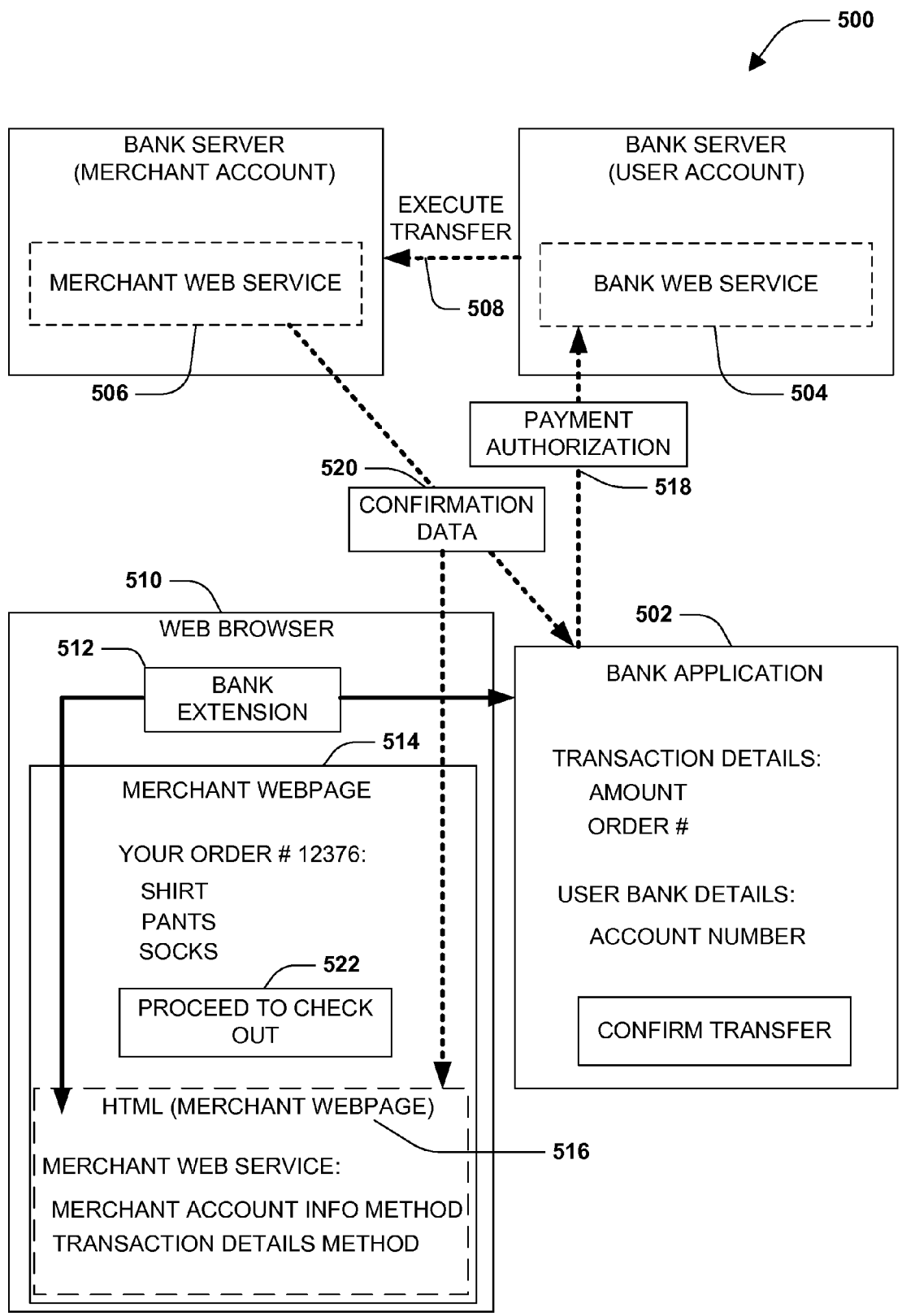
FIG. 5 is an illustration of an example of an application invoking a first web service to establish a data connection, outside a web browser, to a second web service.

FIG. 5 illustrates an example 500 of an application (e.g., a bank application 502) invoking a first web service (e.g., bank web service 504) to establish a data connection 508, outside of a web browser 510, to a second web service (e.g., merchant web service 506). Example 500 comprises the bank application 502 associated with a bank extension 512 comprised within the web browser 510. The bank application 502 is configured to provide a user interface to a user's bank (e.g., through communicating with the bank web service 504). The bank application 502 may be configured to receive information regarding a second bank (e.g., merchant web service) from the bank extension 512. The bank application 502 is further configured to establish a data connection between two bank servers for the purpose of validating a transaction (e.g., payment authorization and confirmation) outside the web browser 510.

The web browser 510 comprises the bank extension 512. A user may use the web browser 510 to browse to a merchant webpage 514. The user may select items (e.g., shirt, pants, socks) to purchase from the merchant webpage 514 by interacting through the web browser 510. The user has the option to invoke a proceed to check out button 522 that may request the user to input personal bank information for the merchant to use in completing the transaction. The user may not trust the merchant webpage 514 to a level where the user is willing to input personal bank information directly through the web browser 510 into the merchant webpage 514.

Alternatively, the user may circumvent inputting personal information into the merchant webpage 514. If a webpage exposes a web service (e.g., remotely invokable methods) that provides additional functionality (e.g., merchant account information, transaction details information, etc.) for completing a transaction, then the user may have the ability to complete the transaction through a trusted application that may execute within a desktop environment of the user's machine. The trusted application uses the exposed information to complete the transaction by connecting a merchant bank server and a user bank server. The connection may allow the user bank server to provide a payment authorization, and the merchant bank server to provide a confirmation, wherein the transaction is completed outside of a web browsing environment.

For example, the merchant webpage 514 comprises an HTML file 516. The HTML file 516 exposes remote functionality by specifying the merchant web service 506. The merchant web service may provide functionality, such as, merchant account information methods, transaction details information methods, transaction confirmation methods, etc. When the web browser 510 receives the HTML file 516 and identifies the merchant web service 506, the bank extension 512 makes a determination that the bank application 502 is compatible with the merchant web service 506 (e.g., the bank application 502 is able to invoke the merchant web service 506). The bank application 502 is invoked. The bank application 502 provides the user with an interface, in which the user may complete the purchase transaction outside of the web browser 510. The user may input or load a configuration comprising connection information for the bank web service 504.

Upon invoking the bank application 502, the bank application 502 may request (e.g., invoke) from the merchant web service 506 information regarding the merchant account, transaction details, and/or any other information relevant to completing the purchase transaction. Once the user approves the transaction within the bank application 502, the bank application 502 may invoke the bank web service 504 by sending a payment authorization 518 to the bank web service 504. The payment authorization 518 may comprise the merchant bank account information, transaction details, and/or information regarding the merchant web service 506. Using the information within the payment authorization 518, the bank web service 504 may establish the data connection 508, outside of the web browser 510, between the bank web service 504 and the merchant web service 506. The bank web service 504 may invoke functionality (e.g., web service, remotely invokable method, etc.) within the merchant web service or send data to the merchant web service 506 over the data connection 508. The merchant web service 506 may send data and/or invoke functionality from the bank web service 504 (e.g., invoke the bank web service functionality), the bank application 502 (e.g., send confirmation data), and/or the web browser 510 (e.g., send confirmation HTML). The bank application 502 facilitates data and functionality execution between the merchant web service 506 and the bank web service 504 by connecting two web services together.

Another example of connecting two web services to complete a transaction is where the user browses the merchant webpage 514. Upon the web browser 510 receiving the HTML file 516 and identifying the merchant web service 506, the bank extension 512 determines the bank application 502 is compatible with the merchant web service 506. The bank application 502 is invoked. The user may enter bank information into the bank application 502 and confirm the transaction (e.g., transfer of payment) through the bank application 502. The bank application 502 invokes (e.g., sends the payment authorization 518) the bank web service 504 to authorize payment. The bank web service 504 establishes the data connection 508, outside of the web browser 510, between the bank web service 504 and the merchant web service 506. Upon determining the payment is to be authorized, the bank web service sends, outside of the web browser 510, an execute transfer signal to the merchant web service 506. The merchant web service 506 completes the transaction and sends the confirmation data 520 to the bank application 502 and the web browser 510.

Another example of connecting two web services is to create recurring transaction requests. The merchant webpage 514 may represent a service that requires periodic payments (e.g., a webpage of a utility company). A user may issue through the bank application 502 the payment authorization 518 for the recurring payments from the bank web service 504 to the merchant web service 506. The authorization will be in force even after the bank application 502 is closed. In effect, it creates a custom connection between the bank web service 504 and the merchant web service 506, wherein the bank web service 504 periodically gets the latest invoice from the merchant web service 506 and delivers a payment on the user's behalf. A similar connection could be created by inputting merchant data into a bank webpage (or bank data into a merchant webpage). The advantage of using bank application 502 is that the correct data is accessed and transmitted electronically, thus simplifying the interaction at the user interface level and avoiding any mistakes associated with mistyping URL strings and/or bank account numbers.

Figure 6:
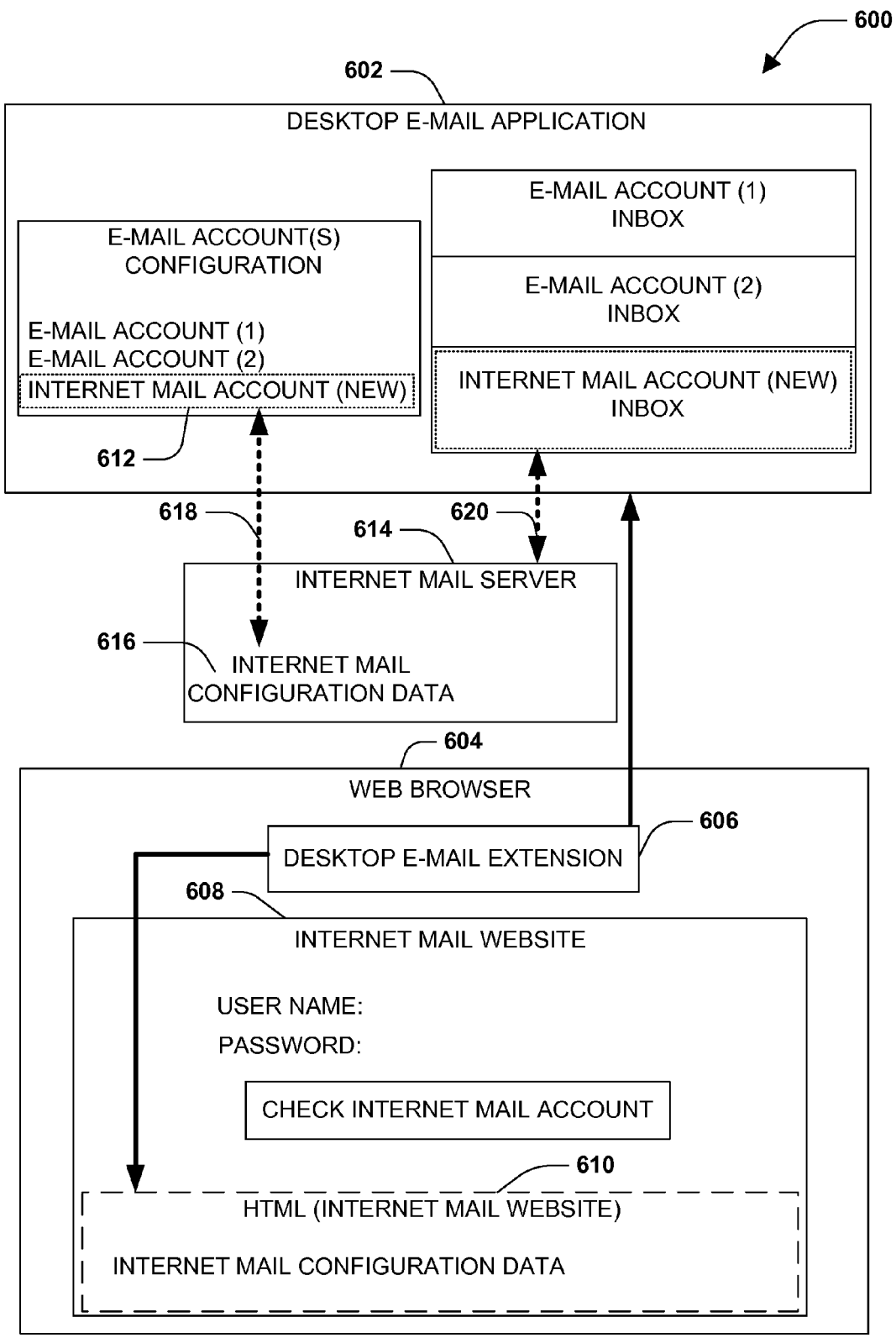
FIG. 6 is an illustration of an example of connecting, outside of a web browser, an application to a web service, wherein the application is configured through a configuration file exposed by a webpage.

FIG. 6 illustrates an example 600 of connecting, outside of a web browser 604, an application (e.g., a desktop e-mail application 602) to a web service (e.g., an Internet mail server 620), wherein the application is configured through a configuration file (e.g., an Internet mail configuration data 616) exposed by a webpage (e.g., an Internet mail website 608). The Internet mail website 608 may be configured to allow a user to interact with an Internet mail account through a web browser. Example 600 illustrates an example where a user may browse the Internet mail website 608 to discover the Internet mail configuration data 616 located on an Internet mail server 614 (e.g., remote location).

The desktop e-mail application 602 may retrieve and configure an Internet mail account 612 accessible, outside of the web browser 604, from the desktop e-mail application 602. Once the desktop e-mail application 602 is configured with the Internet mail configuration data 616 (e.g., remote XML file), the desktop e-mail application 602 may provide a user interface for the user to interact with remote e-mail functionality of the Internet mail account 612 without using the web browser 604.

In example 600, the web browser 604 receives an HTML file 610 in response to a user browsing the Internet mail website 608. The web browser 604 identifies the Internet mail configuration data 616 specified within the HTML file 610. A desktop e-mail extension 606 determines the desktop e-mail application 602 is compatible with the Internet mail configuration data 616 (e.g., the desktop e-mail application 602 is able to configure the Internet mail account 612 from the Internet mail configuration data 616). The desktop e-mail application 602 is invoked and performs a request 618, outside of the web browser 604, for the Internet mail configuration data 616 from the Internet mail server 614. The desktop e-mail application 602 configures the Internet mail account 612 based upon the Internet mail configuration data 616.

Upon configuration, the desktop e-mail application 602 is able to invoke an e-mail functionality 620 from the Internet mail server 614. It may be appreciated that the e-mail functionality 620 may be invoked from a different source based upon the Internet mail configuration data 616 and is not limited to the source of the Internet mail configuration data 616. A user is able to access the e-mail functionality 620, outside of the web browser 604, from the desktop e-mail application 602. The desktop e-mail application 602 may provide a rich user interface with comprehensive security and configuration options, whereas the Internet mail website 608 provides a limited user interface for interacting with the e-mail functionality.

Figure 7:
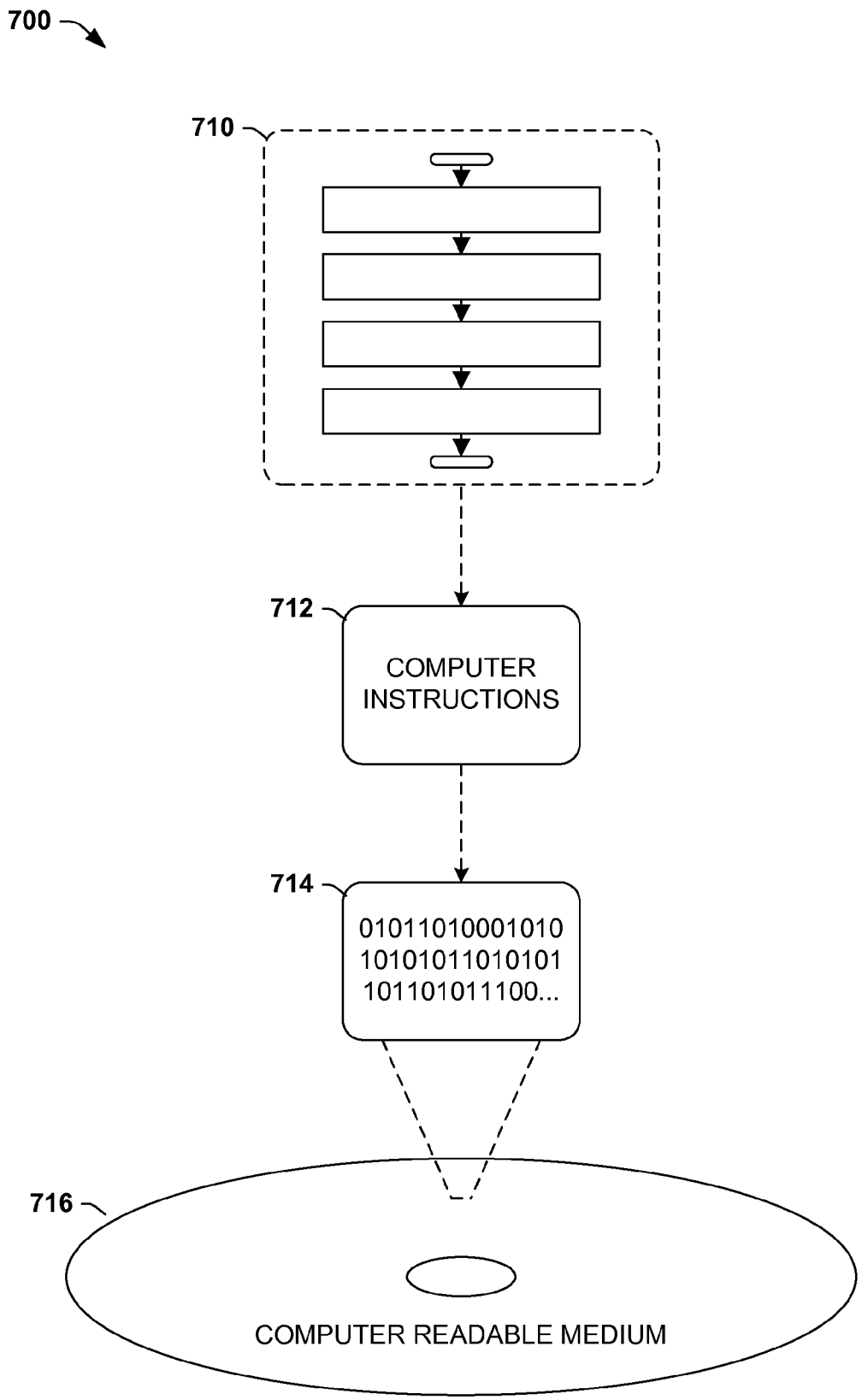
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 716 (e.g., a CD-R, DVD-R, or a platter of a hard disk drive), on which is encoded computer-readable data 710. This computer-readable data 710 in turn comprises a set of computer instructions 712 configured to operate according to one or more of the principles set forth herein. In one such embodiment 700, the processor-executable instructions 714 may be configured to perform a method, such as the exemplary method 100 of FIG. 1, for example. In another such embodiment, the processor-executable instructions 714 may be configured to implement a system, such as the exemplary system 302 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
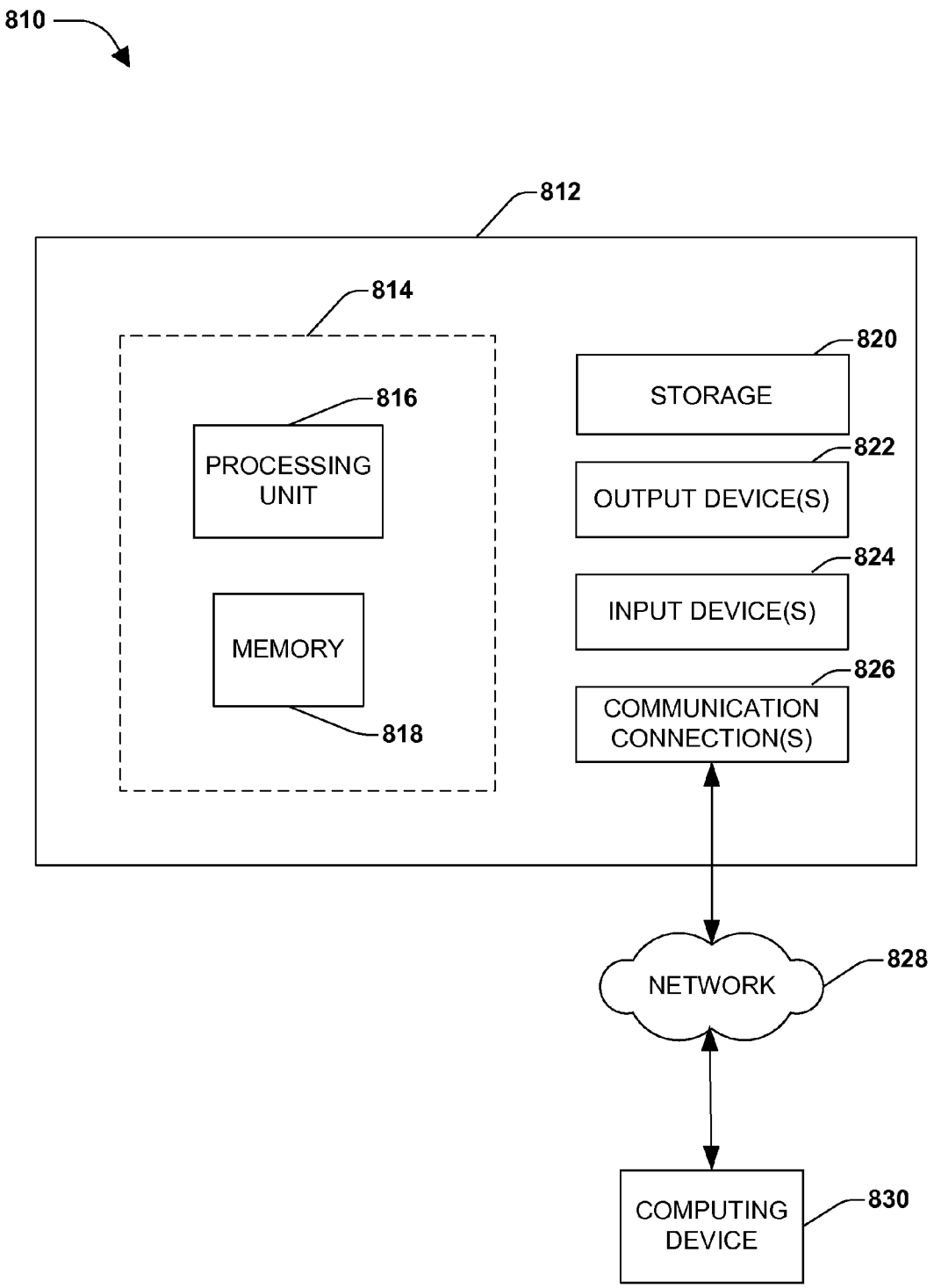
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method comprising:
    transmitting to a web browser a webpage specifying a remotely invokable method invokable by an application configured to execute outside the web browser, the remotely invokable method associated with at least one of:
        a method notification of the remotely invokable method; or
        a compatibility notification of at least one application that is compatible with the remotely invokable method.

2. The method of claim 1, the application configured to provide a result of an invocation of the remotely invokable method.

3. The method of claim 1, the specifying comprising at least one of:
    specifying a web service comprising the remotely invokable method;
    specifying a webpage address comprising the remotely invokable method;
    specifying a server comprising the remotely invokable method;
    specifying a security parameter for invoking the remotely invokable method;
    specifying a configuration parameter for invoking the remotely invokable method;
    specifying an actual data type provided by the remotely invokable method;
    specifying the remotely invokable method within HTML;
    specifying the remotely invokable method within a programming language file; or
    specifying the remotely invokable method within an XML file.

4. The method of claim 3, the specifying the remotely invokable method within HTML comprising:
    specifying within an HTML header tag.

5. The method of claim 3, the specifying the remotely invokable method within HTML comprising:
    specifying within an HTML body tag.

6. The method of claim 1, comprising:
    specifying a functionality of the remotely invokable method.

7. The method of claim 6, comprising:
    determining the at least one application based upon the functionality.

8. A system, comprising:
    one or more processing units; and
    memory comprising instructions that when executed by at least one of the one or more processing units perform actions comprising:
        transmitting to a web browser a webpage specifying a remotely invokable method invokable by an application configured to execute outside the web browser, the web browser and the application associated with a browser extension that, responsive to receipt of a compatibility confirmation indicating that the application is compatible with the remotely invokable method, invokes the application.

9. The system of claim 8, the application configured to provide a result of an invocation of the remotely invokable method.

10. The system of claim 8, the specifying comprising at least one of:
    specifying a web service comprising the remotely invokable method;
    specifying a webpage address comprising the remotely invokable method;
    specifying a server comprising the remotely invokable method;
    specifying a security parameter for invoking the remotely invokable method;
    specifying a configuration parameter for invoking the remotely invokable method;
    specifying an actual data type provided by the remotely invokable method;
    specifying the remotely invokable method within HTML;
    specifying the remotely invokable method within a programming language file; or specifying the remotely invokable method within an XML file.

11. The system of claim 10, the specifying the remotely invokable method within HTML comprising one or more of:
specifying within an HTML header tag; or
specifying within an HTML body tag.

12. The system of claim 8, the actions comprising:
specifying a compatible applications list corresponding to the remotely invokable method.

13. The system of claim 8, the actions comprising:
specifying a functionality of the remotely invokable method.

14. The system of claim 13, the actions comprising:
determining whether one or more applications outside the web browser are compatible with the functionality of the remotely invokable method.

15. A computer-readable storage medium configured to perform a method comprising:
transmitting to a web browser a webpage specifying a remotely invokable method invokable by an application configured to execute outside the web browser, the application invoked responsive to a determination that the application is specified within a compatible application list.

16. The computer-readable storage medium of claim 15, the application configured to provide a result of an invocation of the remotely invokable method.

17. The computer-readable storage medium of claim 15, the specifying comprising at least one of:
specifying a web service comprising the remotely invokable method;
specifying a webpage address comprising the remotely invokable method;
specifying a server comprising the remotely invokable method;
specifying a security parameter for invoking the remotely invokable method;
specifying a configuration parameter for invoking the remotely invokable method;
specifying an actual data type provided by the remotely invokable method;
specifying the remotely invokable method within HTML;
specifying the remotely invokable method within a programming language file; or
specifying the remotely invokable method within an XML file.

18. The computer-readable storage medium of claim 17, the specifying the remotely invokable method within HTML comprising:
specifying within an HTML header tag.

19. The computer-readable storage medium of claim 17, the specifying the remotely invokable method within HTML comprising:
specifying within an HTML body tag.

20. The computer-readable storage medium of claim 15, the method comprising:
specifying a functionality of the remotely invokable method.

* * * * *